US008583523B2

(12) United States Patent
Manfredi et al.

(10) Patent No.: US 8,583,523 B2
(45) Date of Patent: Nov. 12, 2013

(54) METHOD AND SYSTEM FOR PROVIDING FINANCIAL SERVICES

(76) Inventors: Mirko Manfredi, Honolulu, HI (US); Mia Kim, Honolulu, HI (US)

( * ) Notice: Subject to any disclaimer, the term of this patent is extended or adjusted under 35 U.S.C. 154(b) by 519 days.

(21) Appl. No.: 12/030,046

(22) Filed: Feb. 12, 2008

(65) Prior Publication Data

US 2008/0195438 A1 Aug. 14, 2008

Related U.S. Application Data

(60) Provisional application No. 60/983,509, filed on Oct. 29, 2007, provisional application No. 60/889,530, filed on Feb. 12, 2007.

(51) Int. Cl.
*G06Q 40/00* (2012.01)
(52) U.S. Cl.
USPC ................................................. 705/35; 705/38
(58) Field of Classification Search
USPC ........................................................ 705/38, 35
See application file for complete search history.

(56) References Cited

U.S. PATENT DOCUMENTS

| 5,774,663 A * | 6/1998 | Randle et al. ............. 709/204 |
| 2002/0095363 A1 * | 7/2002 | Sloan et al. ............... 705/36 |
| 2002/0123949 A1 * | 9/2002 | VanLeeuwen ............. 705/35 |
| 2003/0028466 A1 | 2/2003 | Jenson et al. |
| 2003/0149653 A1 | 8/2003 | Penney et al. |
| 2006/0155632 A1 | 7/2006 | Cherkas et al. |
| 2009/0006239 A1 * | 1/2009 | Robinson et al. ............ 705/35 |
| 2009/0254971 A1 * | 10/2009 | Herz et al. ................... 726/1 |

OTHER PUBLICATIONS

PCT International Search Report and Written Opinion of the International Searching Authority, issued Jul. 9, 2008, application No. PCT/US08/53684.
Wells Fargo Spending Report, "Business and Personal Spending Report", https://online.wellsfargo.com/das/cgi-bin/session. cgi?sessargs=TbZV7BzWcBOANGZ2La . . . .
Wells Fargo Small Business—Business Online Banking—Spending Report, "Business Spending Report", https://online.wellsfargo.com/biz/products/online_banking/bob/report.jhtml.
Wells Fargo Small Business—Business Online Banking—Spending Report FAQ, "Business Spending Report—Frequently Asked Questions", https://online.wellsfargo.com/biz/online_banking/spending_report/faq?_requestid+25627.

* cited by examiner

*Primary Examiner* — Bruce I Ebersman
*Assistant Examiner* — John Anderson
(74) *Attorney, Agent, or Firm* — Arc IP Law, PC; Joseph J. Mayo

(57) ABSTRACT

A method and system for providing financial services are described. The method and system include receiving financial information. The financial information includes financial transaction(s) of a user. The method and system also include determining financial advice based on the financial information. The financial advice indicates a change corresponding to the financial transaction(s). The method and system further include displaying the financial advice to the user.

7 Claims, 4 Drawing Sheets

METHOD AND SYSTEM FOR PROVIDING FINANCIAL SERVICES

CROSS-REFERENCE TO RELATED APPLICATIONS

This application claims the benefit of provisional Patent Application Ser. No. 60/889,530, entitled "Method and System for Providing a Variety of Financial Services" filed Feb. 12, 2007, assigned to the assignee of the present application. This application also claims the benefit of provisional Patent Application Ser. No. 60/983,509 entitled "Method and System for Providing Financial Services" filed Oct. 29, 2007 and assigned to the assignee of the presented application. Both applications are incorporated herein by reference.

BACKGROUND OF THE INVENTION

In determining an individual's financial well-being, income and expenditures are the two primary variables. In general, a person who spends less than s/he makes has better financial health than one who does not. If a person's expenses are higher than their income, a person can take the appropriate action. In order to improve their financial health, they should either reduce expenses or increase their income. Over time, inaction only worsens their financial health. The use of credit cards or other forms of credit can further exacerbate this issue. Such forms of credit may be viewed as teaching a practice of making payments on everything a consumer wishes to purchase. Large late fees, variable interest rates, late charges, overdraft fees, and other fees make such practices difficult to maintain. As a result, many people have difficulty managing their money.

Various conventional products exist to aid consumers in managing their financial well-being. For example, there are existing books publications and articles on budgeting and how to save money. Many of these tools describe tracking and keeping notes on where an individual spends their money. Other conventional products store financial information for a user and allow the user to view some portion of the information. For example, a user's accounts with a particular bank may be linked. The bank automatically stores a record of the account activity. Through the Internet, the user may use their home computer to view the activity over a specified time period. Suppose a user has a checking account, a stored value, or debit, card, and a credit card with a particular bank. Using such a conventional product, deposits, withdrawals, point-of-sale (POS) transactions or other purchases associated with the debit card, and/or credit card transactions over a particular time period may be stored and viewed by the user. Some conventional products also categorize at least some of the account activity. For example, a user may be allowed to view the total amount of charitable contributions, purchases for gas, purchases for airlines/travel or other similar financial transactions for the time period.

Although such conventional products provide an opportunity for a user to improve management of their finances, they are often ineffective. As can be seen by statistics such as the low savings rate in the United States, many consumers remain unable to maintain financial well-being. People are busy and don't have time to keep track of every expense or payment. For this and other reasons, many of these products are not sufficiently helpful in allowing individuals to manage their finances.

BRIEF SUMMARY OF THE INVENTION

A method and system for providing financial services are described. The method and system include receiving financial information. The financial information includes financial transaction(s) of a user. The method and system also include determining financial advice based on the financial information. The financial advice indicates a change corresponding to the financial transaction(s). The method and system further include displaying the financial advice to the user.

According to the method and system disclosed herein, the financial advice, particularly mechanisms for reducing expenditures, can be automatically provided to a user. As a result, a user may be better able to manage their financial well-being.

DETAILED DESCRIPTION OF THE INVENTION

The method and system relate to financial services. The following description is presented to enable one of ordinary skill in the art to make and use the invention and is provided in the context of a patent application and its requirements. Various modifications to the embodiments and the generic principles and features described herein will be readily apparent to those skilled in the art. Thus, the method and system are not intended to be limited to the embodiments shown, but is to be accorded the widest scope consistent with the principles and features described herein.

The method and system are mainly described in terms of particular systems provided in particular implementations. However, one of ordinary skill in the art will readily recognize that this method and system will operate effectively in other implementations. For example, the systems, devices, and networks usable with the present invention can take a number of different forms. The method and system will also be described in the context of particular methods having certain steps. However, the method and system operate effectively for other methods having different and/or additional steps not inconsistent with the method and system.

Figure 1:
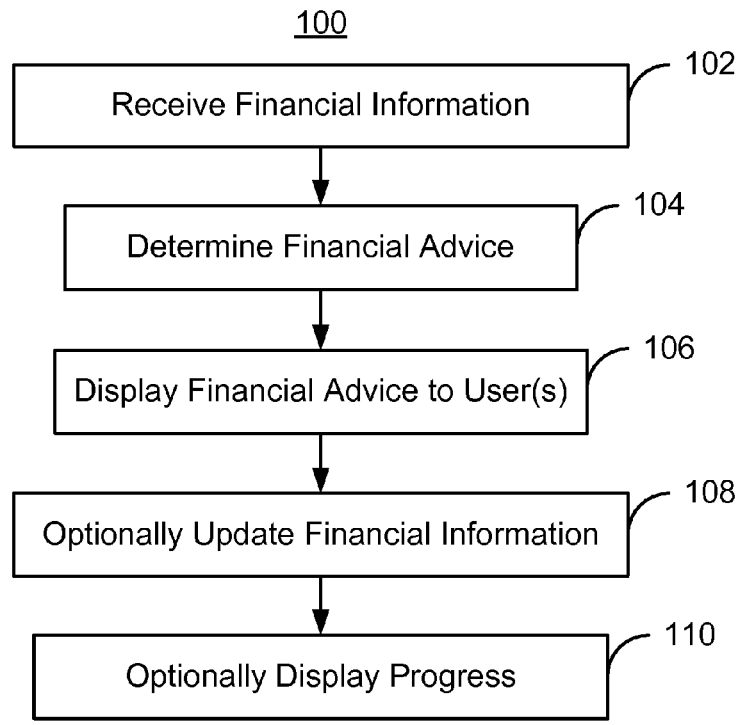
FIG. 1 depicts an exemplary embodiment of a method for providing financial services.

FIG. 1 depicts an exemplary embodiment of a method 100 for providing financial services to users. The method 100 may be implemented using a computer system. In one embodiment, a system of server(s) and database(s) coupled with displays, for example in a user's personal computer system and/or a kiosk the user utilizes, may be used. The method 100 is also described in the context of particular steps. However, one of ordinary skill in the art will recognize that steps may be omitted or combined and that additional steps (not shown) could be added.

In one embodiment, the method 100 is used to provide financial services to users corresponding to particular accounts. For example, the method 100 may be employed for users of cards, such as personal identification number (PIN) based cards, signature based cards, credit cards, and/or stored value cards. In one embodiment, the card is a personal identification number (PIN)-based card. Thus, in order to use the card, the user would enter a PIN. The PIN-based card could be a stored value or a credit card. In another embodiment, the card may be a signature-based card. A signature-based card may be a stored value card or a credit card that can be used with a validated signature. In one such embodiment, the method 100 corresponds to a PIN-based value or signature-based card. In such an embodiment, use of the method 100 may provide an impetus for a user to maximize the use of the card for all financial transactions. Consequently, the single card may be provided at little or no fee to the user. Instead, fees may be charged to merchants accepting the card, for example on a per use or transaction amount basis. Because the bank backing the card can obtain payment based on use and because use may be encouraged in order to obtain the benefits of the method 100, the user may be spared fees for the card. However, although described in the context of a single card or account, the method 100 could be associated with multiple cards and/or accounts. Alternatively, the method 100 could utilize another mechanism for determining users for which financial services are to be provided.

Financial information for the users is received, via step 102. The financial information received in step 102 could include a variety of data received at various times and in multiple ways. For example, the user, the bank with which the user has an account/card, credit agencies, businesses with which the user has transactions, employers, and/or other relevant entities may provide the financial information received in step 102.

The financial information received in step 102 includes data related to financial transactions in which the users participate. In one embodiment, the information received is for transactions completed utilizing the users' PIN-based and/or signature-based card(s). Stated differently, the financial information received in step 102 includes transactions associated with a particular card. In other embodiments, information for other transaction(s) may also be received in step 102. For example, information related to transactions from other accounts linked to the card(s) or otherwise associated with the users may be received. In step 102, the financial information related to the transactions may be received from individuals or businesses engaged in the transaction. For example, the financial information may be received from POS devices such as registers, telephones, computer systems, or other devices that may be coupled via a network. In some embodiments, information may also be received from the users themselves or from another entity. The financial information related to the transaction may include the parties to the transaction, the location of the transaction, the amount of transaction, the time of the transaction, the type of good in the transaction and/or other information.

In one embodiment, step 102 includes archiving the information received in a database or other memory. In so doing, the financial information may be categorized at least based on the users' identities or accounts. In one embodiment, the financial information is also categorized as described below, then stored. In another embodiment, however, the categorization below is not performed for archiving.

Financial advice for the users is determined based on the financial information, via step 104. More particularly, the financial advice is based on the transactions in which the user has engaged. In one embodiment, step 104 is performed in response to a query from the user. For example, the user may request to view their financial information through a web browser on the user's personal computer system. Alternatively, the user might make a request from through a computer system in a kiosk or other device accessed by the user. In one embodiment, the financial advice is determined simply when the user makes a request to view the financial information. In another embodiment, the financial advice is determined if such advice is explicitly requested.

In order to determine the financial advice in step 104, the financial information is tracked and analyzed. Tracking includes archiving and accessing the information. The tracking and analysis may include categorizing transactions. In one embodiment, the tracking also includes displaying the financial information to the user in an understandable format, for example based on the categories. The analysis determines changes to the transactions which may reduce expenditures. Thus, the analysis may determine one or more categories targeted for a reduction in expenditures. The analysis may incorporate a number of factors, including but not limited to the user's income, the household income, the number of times a particular type of transaction is engaged in over a time period, the number of transactions, geographic region, the user's profession, statistics, and/or other similar criteria. For example, step 104 may include comparing the amount spent by the user for transactions in a particular category to an average amount spent in the same category, for the same amount of time, the same income range, individuals in the same geographic region, the same profession, or other measure. The number of times per duration of the analysis that particular transactions occur may also be used in determining the financial advice. For example, the number of times per week a user dines out may also be analyzed and compared to some norm. Based on such factors, the analysis may identify a particular category of transaction may be targeted for reduction. In one embodiment, only one category is targeted for reduction first. Other categories might be targeted later. In another embodiment, multiple categories may be immediately targeted for reduction in expenses. In addition to the factors above, the analysis may include a ranking of each category. The ranking corresponding to an indication of a necessity of the transaction(s) in the category. For example, a category including medical expenses would be less likely to be selected for a reduction than a category including dining out.

In addition, in one embodiment, the users' preferences may also be accounted for in determining the advice in step 104. For example, the user may select a category to be targeted for a reduction in expense. In such an embodiment, the advice will be tailored for that category. In one embodiment, the user may determine how aggressive the change may be. In one embodiment, the user may select from very aggressive, aggressive, average, slight/small changes. Based on the user's selection, the advice determined may differ. Thus, the users' preferences may also be used in determining the advice in step 104.

The financial advice determined in step 104 indicates a change corresponding to the financial transactions. More specifically, the financial advice indicates a reduction in expenditures in one or more of the categories. In addition, a user may be allowed to select a particular category to be targeted for reduction or other preferences. In one embodiment, the expenditure may be targeted for reduction for a particular duration, such as a week, a month, or a year.

In addition to recommending a reduction, the financial advice might determined in step 104 may include a mechanism for reducing expenditures in the targeted category. For example, the financial advice might include reducing the amount spent in the dining out category for a month. The amount desired to be reduced may be expressed as a percentage, for example a percentage of the total, a percentage of the norm, or a percentage of the differences. The mechanism for achieving the reduction may include a substitute behavior. The financial advice might also compare the cost of the suggested behavior to the transaction costs to indicate to the user how much would be saved. Further, as time progresses, the financial advice offered in step 104 may be updated. Thus, the financial advice may be updated to adapt to changes in the users' behavior and to facilitate changes in the users' behavior.

Once the analysis determines the financial advice, the financial advice is displayed to users, via step 106. Step 106 may include displaying the financial advice on the display for the user's computer system or a kiosk. Thus, the advice may be displayed remotely and accessible at any time. In one embodiment, the financial advice is graphically displayed. Consequently, in such an embodiment, the financial advice is not merely printed as text or played as sound. Instead, other graphics accompanies the advice. The graphics may be color and may include graph(s) indicating amounts spent in different categories and/or savings if the advice is followed and/or a character providing the advice. The "appropriate" amounts to be spent in each category as well as the amounts actually spent may thus be determined, categorized, and provided to the customer via color graphs. The graphics may also be animated to change over time.

Further, as part of displaying the advice in step 106, rewards for following the advice or other desired behavior may be displayed. If the advice is followed, for example if the user reduces expenses in the desired category, the user is congratulated on their success. In addition to positive feedback, such rewards may also include the money saved, discounts, cash back, products, services or other items. In one embodiment, the rewards offered may include upgrades, for example from a PIN-based card to a signature-based card or from a signature-based card to a credit card. In such a case, the reward may be in response for desired behavior separate from following specific advice. For example, as discussed above, upgrading of the user's card may be based upon a particular number of transactions being completed without problems or fraudulent transactions. Similarly, the reward could include upgrading the user's account such that their employer directly deposits the user's pay into the user's account, providing the user with a computer system at reduced cost so that the user's access to their financial information and advice is facilitated, The financial information may be optionally updated, via step 108. Step 108 includes receiving additional financial information after the financial advice has been displayed to the user. Thus, information related to additional transactions may be received and analyzed in an analogous manner to that performed in steps 102 and 104. In addition, the analysis may determine from the additional transactions whether and to what extent the user has followed the financial advice. Similarly, where rewards were offered, the analysis determines whether to provide the reward(s) to the users.

The user's progress is optionally displayed, via step 110. The current financial information, as organized into categories and otherwise tracked and processed, may thus be displayed to the user. The display may be performed using systems such as the user's computer system and/or a kiosk. The current information may include information received since the advice was displayed in step 106. Further, the current information may be displayed along with the previous financial information from which the financial advice was determined. Thus, a user's progress may be determined.

Using the method 100, a user's expenditures may be tracked and analyzed. It may be determined whether there are expenditures which the user can or should reduce. Research and statistics may be used to determine the appropriate amounts to spend in each category. In addition to identifying areas ripe for reduction, the method 100 provides suggestions for modifying the user's behavior to achieve the reductions. To further improve the possibility that a user will heed the advice, rewards may be offered, the user's progress tracked and displayed, and the comparisons made to the user's prior expenditures. This information may be readily accessible, for example from the users' computer systems, via the Internet, and from the kiosks.

Figure 2:
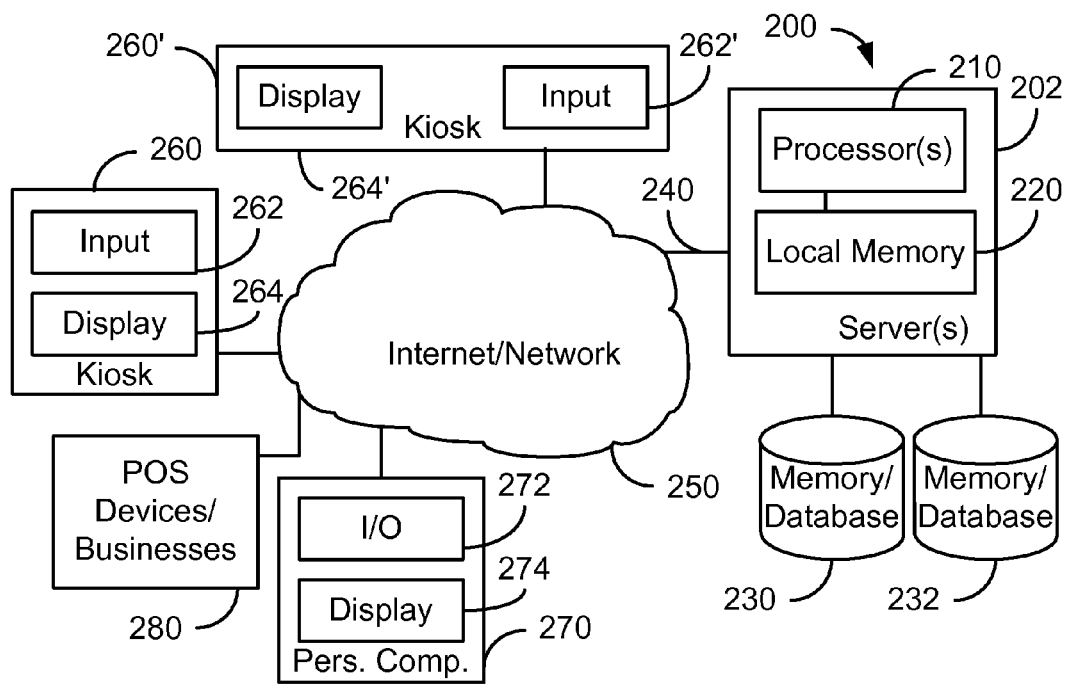
FIG. 2 depicts an exemplary embodiment of a system for providing financial services.

FIG. 2 depicts an exemplary embodiment of a system 200 for providing financial services. The system 200 is shown in connections with other components used by the system 200. Thus, FIG. 2 depicts the system 200, the internet or other network 250, kiosks 260 and 260', personal computer system 270, and POS or other devices 280 at businesses. Each kiosk 260/260' includes an input 262/262' through which the user may enter data and display 264/264'. Other components (not shown) may be provided in the kiosks 260/260'. The personal computer system 270 includes an input/output (I/O) 272 and display 274. Although only one display 264/264'/274 and one input or I/O device 262/262'/272 is shown, multiple displays, input or I/O and other devices may be provided. Similarly, although only one personal computer 270 and POS device 280 is shown, multiple devices 270 and 280 may be used. The system 200 includes server(s) 202 including processor(s) 210, local memory 220, memory/databases 230 and 232, and input 240. Although a particular number of components 210, 220, 230, 232, and 240 are shown, another number of processors, servers, memories/databases and other components in the system 200 may be used.

The system 200 may be used in performing the method 100. In particular, the system 200 may receive financial information in step 102 from the Internet/network 250 through the input 240. The data may be archived in the memories/databases 230 and 232. The processor(s) 210 may be used in determining the financial advice in step 108.

Figure 3:
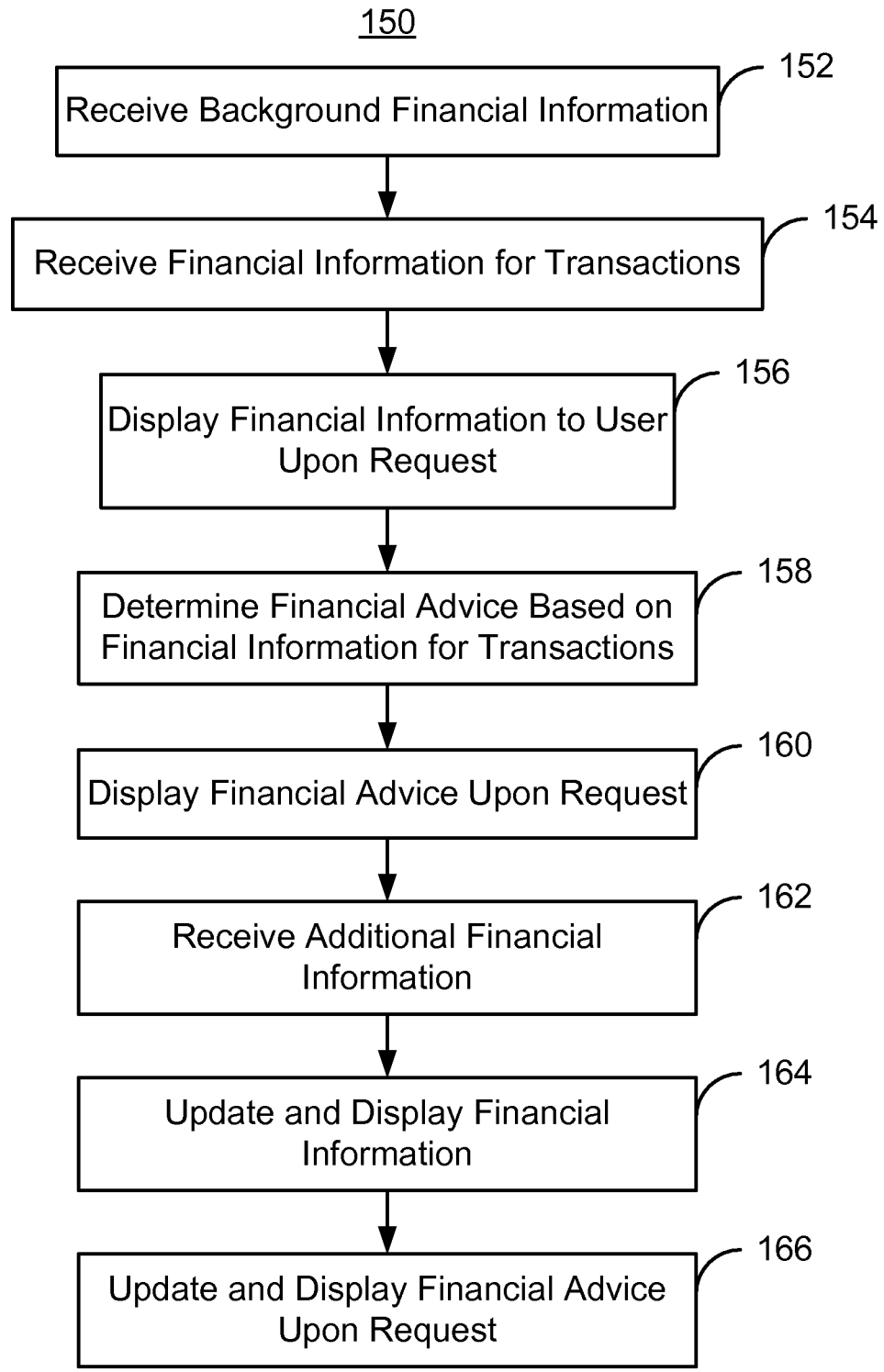
FIG. 3 depicts another exemplary embodiment of a method for providing financial services.

FIG. 3 depicts another exemplary embodiment of a method 150 for providing financial services. The method 150 may be implemented using a computer system, such as the system 200 depicted in FIG. 2. Consequently, the method 150 is described in the context of the system 200. Referring to FIGS. 2 and 3, the method 150 is also described in the context of particular steps. However, one of ordinary skill in the art will recognize that steps may be omitted or combined and that additional steps (not shown) could be added. Further, the steps of the method might be performed in another order and/or repeated. In one embodiment, the method 150 is used to provide financial services to users corresponding to particular accounts. Consequently, the method 150 is described in the context of transactions for a single card and/or account. However, the method 150 could be associated with multiple cards and/or accounts.

Background financial information is received by the system 200, via step 152. The background financial information received in step 152 could include a variety of data received at various times and in multiple ways. In one embodiment, the background financial information is received from the Internet/network 250 via input/output 240. In such an embodiment, the user might enter at least a portion of the information using the input 262/262' of the kiosk 260/260' or the input/output 272 of the personal computer 274. In one embodiment, the background information may also be provided to the system 200 in another manner. In one embodiment, step 152 includes archiving the background financial information received. For example, the system 200 may use the server(s)

202 to temporarily store the financial information in the local memory 220 and archive the information in the memory/database 230/232.

The background information includes all financial, and possibly other, information that is not directly related to financial transactions for which financial information is received in step 154. For example, users may sign up for the services provided using the method 100. In so doing, a user may provide some financial information such as the user's income, account information, and other demographic information. The background information received in step 152 may also include financial information otherwise related to the user. For example, in addition to income, the desired total expenditure or amount desired to be saved and/or other information related to the user may be received in step 152. Other financial information may be obtained from credit agencies, the banks with which the user has accounts, businesses with which the user has transactions, and/or other relevant entities. The method 150 may be part of a set of services, for example associated with the user's account or as a benefit of employment. In such a case, the user may not need to provide the information. Instead, at least some of the financial information may be provided by the employer, banks with which the user has the account and/or other entities.

The background financial information may also be updated. For example, the method 150 may be employed for users of cards, such as PIN-based or signature-based cards. In one such embodiment, a user commences with a PIN-based card. After a pattern of behavior is established with the PIN-based card, the PIN-based card may be exchanged, or upgraded to a signature-based card. For example, the user may be provided with the PIN-based card. After a particular number of uses without fraudulent transactions, the PIN-based card may be exchanged for or enhanced to a signature-based card. The signature-based card may be further upgraded to a credit card based on the user's continued positive behavior pattern. The PIN-based card, the signature-based card and the credit card, if any, thus correspond to the same account. Step 152 may thus include initially receiving the account information for the PIN-based or signature-based card. In such an embodiment, step 152 would include receiving information related updating the information, for example updating an amount stored in the PIN-based card, indicating a change to signature-based from PIN-based, enhancing to a credit card, providing credit limits for the credit card (where applicable), as well as other information updating that allows the user to access their account. As the account changes from a PIN-based card to a signature-based card and, potentially, to a credit card, the background information is updated to reflect the change.

In another embodiment, the method 150 may provide financial services for multiple cards corresponding to different accounts. The account information for all of these accounts may be received in step 152. If the users wish to track financial information for accounts and/or cards not otherwise accounted for in the method 150, this information may be received in step 152. For example, in one embodiment, the users might enter information on transactions completed using other cards.

Financial information related to financial transactions associated with the users' accounts are received by the system 200, via step 154. In one embodiment, the method 150 corresponds to a single card/account. In such an embodiment, step 154 would include receiving transaction information for that card/account. Services such as the financial tracking, analysis, and advice provided via the method 150 provide the impetus for the users to maximize the number of financial transactions through the card and minimize the number of financial transactions completed in another way. Step 154 thus includes receiving data related to financial transactions in which the users participate and in which the users' card(s) are employed. In other embodiments, information for other transaction(s) may also be received in step 154. For example, information related to transactions from other accounts linked to the card(s) or otherwise associated with the users may be received. In step 154, the financial information related to the transactions may be received from individuals or businesses engaged in the transaction with the users, from the users themselves, or from another entity. For example, the financial information may be received from the businesses 280 through the input/output 240. The information may be from POS devices such as registers, telephones, computer systems, or other devices that may be coupled to the system 200 via the network/Internet 250. The financial information related to the transaction may include the parties to the transaction, the location of the transaction, the amount of transaction, the time of the transaction, the type of good in the transaction and/or other available information.

In one embodiment, step 154 includes archiving the information received. For example, the system 200 may use the server(s) 202 to temporarily store the financial information in the local memory 220 and archive the information in the memory/database 230/232. In so doing, the financial information may be organized at least based on the users' identities or accounts. In one embodiment, the financial information is also categorized as described below, then stored. In another embodiment, however, the categorization below is not performed for archiving.

The financial information may be displayed to the users upon request, via step 156. In one embodiment, step 156 may be performed at substantially any time the users' request is received. For example, the request may be made through the kiosk 260 and 260' or the users' personal computers 270. In one embodiment, the request is required to be for a particular amount of time. For example, the user might be required to select between day, week, month, or year time frames. Alternatively, a default time period may be selected for the display. In such an embodiment, the user may or may not be allowed to change the time period. In response to the users' requests, the financial information is provided to the kiosk 260/260' or personal computer 270 and shown on the display 264/274. If the financial information has already been stored in particular categories, the information in at least some of these categories may simply be displayed to the user. Alternatively, the categories in which to display the financial information may be determined only in response to the users' requests to view the financial information. A further discussion of the categorization of financial information, particularly that related to transactions, is below.

Figure 4:
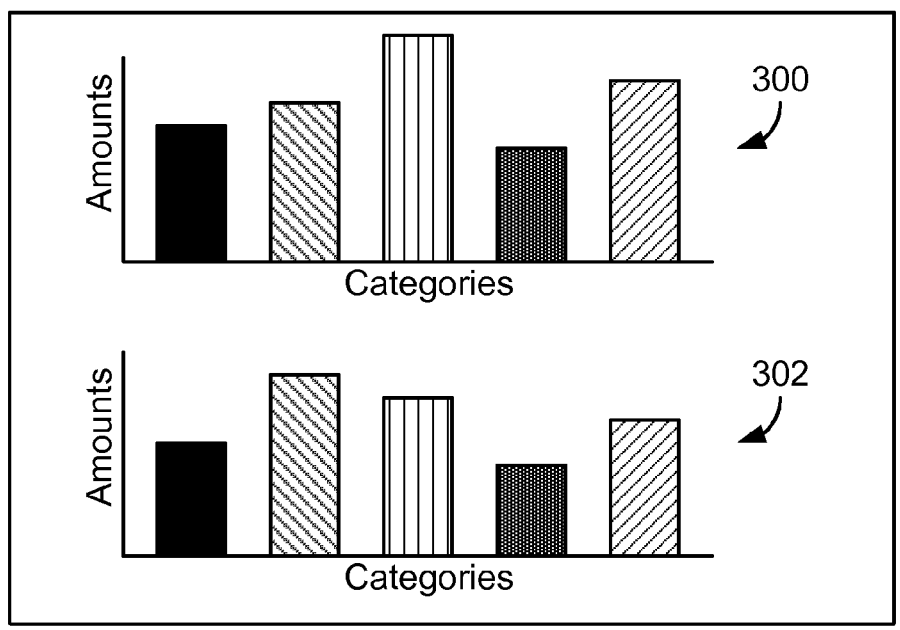
FIG. 4 depicts an exemplary embodiment of a display providing financial services.

The financial information may be displayed in a number of ways. In one embodiment, the financial information may simply be displayed via text, for example in a table format. In such an embodiment, each column in a table may represent a category while each row represents an expenditure, or vice versa. The financial information may also be graphically displayed. For example, bar or other graphs might augment or replace the use of tables. In such an embodiment, each bar may represent a category of expenses. FIG. 4 depicts an exemplary embodiment of a display depicting the financial information in the form of bar graphs 300 and 302. Bars in the graphs 300 and 302 may have different colors, shading, or other visual cue that makes the bars easier to view. Different graphs 300 and 302 may correspond to different time periods, different category sets, or other different features. Referring back to FIGS. 2-3, text may also be included, for example to indicate the exact height/expenditure corresponding to the bar. Icons and/or characters may also be provided to allow the users to navigate through the financial information and/or explain the financial information. Further, animation and music and/or other sounds may accompany the display to enhance the users' experience. Thus, the users' financial information may be tracked. Tracking includes archiving the information, accessing the information, and displaying the information for example in steps 152, 154, and 156.

Financial advice for the users is determined based on the financial information, via step 158. More particularly, the financial advice is based at least on the financial information received in step 154, for transactions in which the user has engaged. In one embodiment, other information such as income or other background financial information received in step 152 may be used. In one embodiment, step 158 is performed in response to a query from the user. For example, the user may request to view their financial information through a web browser (not specifically shown in FIG. 2) on the user's personal computer system 270. Alternatively, the user might make a request from through a computer system in a kiosk 260/260' or other device accessed by the user. The request may also take various forms. In one embodiment, the request may simply be to view the users' financial information. The request may include more specifics, for example a particular time period, such as a month, account or category of expenses. Thus, the request that results in the financial information being displayed in step 156 may also result in financial advice being determined in step 158. In another embodiment, the financial advice is determined only if such advice is explicitly requested.

In order to determine the financial advice in step 158, the financial information is analyzed. In one embodiment, step 158 is performed using processor(s) 202 using data loaded from the memory 230/232 to the local memory 220. The analysis performed in step 156 may include categorizing transactions. In one embodiment, the categorization is performed in response to the request and for transactions within a specified time period for which the user requests advice and/or display. Alternatively, the categorization may be performed as the information for the transactions is received. In such an embodiment, the categorization may also be considered part of step 154. Thus, transactions may be placed in categories such as "entertainment", "dining out", or "medical expenses." Thus, various categories may be utilized. In one embodiment, there are seventeen categories. In this embodiment, these categories include (in no particular order): (1) Auto Gas and Oil; (2) Auto Repairs; (3) Child Care, Day Care, Elderly Care, Medical; (4) Clothing; (5) Entertainment, Cable, Internet, Recreation; (6) Food-Dining Out; (7) Food-Groceries; (8) Households; (9) Utilities; (10) Travel-Hotel, Car Rental, Airlines; (11) Liquor Stores, Convenience Stores, Mini Marts, Specialty; (12) Schools; (13) Professional Services; (14) Personal Services; (15) Chain Stores; (16) Miscellaneous Unclassified; and (17) Miscellaneous Industrial Supplies. In one embodiment, transactions may also be divided into sub-categories. For example, category (6) may be divided into (i) food (e.g. purchased for preparation at home and (ii) dining out.

In one embodiment, standardized codes may be used to place the transactions in the categories and analyze users' financial transactions. Each standardized code might correspond to one or more categories. Thus, transactions having particular standardized code(s) are placed in the corresponding categories in step 158. For example, standard industrial classification (S.I.C.) codes may be used. S.I.C. codes appear in, for example, a company's disseminated Edgar filings to indicate the company's type of business. These codes may also used be in the division of corporation finance as a basis for assigning review responsibility for the companies' findings. Thus, the S.I.C. codes may be used to determine the type of business in which the store engages. In one embodiment, each business corresponds to a single code. However, in another embodiment, multiple codes might be associated with a single business. The standardized codes might be obtained in a number of ways. For example, a list of S.I.C. codes may be purchased from financial services firm(s). Such a list may include a large number of companies and their corresponding S.I.C. codes. In one embodiment, the list includes codes for businesses in specified regions, for example certain states. Thus, in one embodiment, a list of S.I.C. codes may be purchased for desired region(s) in the U.S. In one embodiment, the list displays the codes for all known businesses in the state(s). In one embodiment, the list may contain not only the business names and S.I.C. codes, but also their address. In one embodiment, the codes for a different number of states and/or countries may also be obtained. For example, a list of the codes for the business in all fifty states and and/or eventually in different countries may be obtained. In addition, in another embodiment different and/or additional information for the businesses may be provided along with the codes.

Each S.I.C. code corresponds to a particular business and may be used to place transactions with that business in a particular category. There may be a large number of businesses, and thus S.I.C. codes, in a particular region. For example, there might be over 12,000 S.I.C. codes for the region. It may be desirable to track and analyze transactions based on a number of categories that is more manageable and/or more meaningful. Therefore, the S.I.C. codes corresponding to the businesses may be placed into categories. In the embodiment described above having seventeen categories, the 12,000 S.I.C. codes would be divided among the seventeen categories. However, nothing prevents another number of categories and/or different categories from being used. In addition, in one embodiment, the categories and the number of categories may change over time. The S.I.C. code for each business list is correlated with a category or categories in which the businesses belongs. Because the number of different S I C codes may be large, the majority of these codes may end up in the miscellaneous category. Thus, it is established into which one of the categories each of the 12,000 S.I.C. code in the list falls.

Thus, each business at which the customer might make a transaction has at least one category corresponding to the S.I.C. code(s) for the store. When a user engages in a financial transaction, such as the purchase of goods or services, in a store, the S.I.C. code for the business is determined. For example, each time a customer uses the PIN-based card or analogous card to make a purchase, a card processor processes this transaction. As part of processing the transaction, information related to the business and transaction is received. In one embodiment, the information received from the location that accepted this card includes the business name, the address, the amount spent, the date and time. This information is received as part of step 154, above. At this time or when the financial information is analyzed in step 158, the business name and address from the card processor are accessed and matched with the list of S.I.C. codes. As discussed above, the S.I.C. codes are linked with the seventeen categories described above. From the S.I.C. code(s) and the link between the S.I.C. codes, the business's category/categories are determined, also in step 158. The category and/or categories corresponding to the business are assigned to the transaction in step 158. Thus, using the list of S.I.C. codes, it can be determined what category of expense the purchase/transaction is to reside. This process may be performed for each expense purchased on the card. As a result, financial information corresponding to the transaction may be categorized.

The analysis performed in step 158 determines changes to the transactions which may reduce expenditures. Thus, the analysis may determine one or more categories targeted for a reduction in expenditures. The analysis may incorporate a number of factors, including but not limited to the user's income, the household income, the number of times a particular type of transaction is engaged in over a time period, the number of transactions, geographic region, the user's profession, and/or other factors. Research, statistics, and/or other similar criteria may be used to determine the appropriate amounts to spend in each category. The appropriate amount might be an average spent in a particular category for a particular income range, an average reduced by some amount, or other amount may be deemed appropriate. For example, the analysis might compare the amount spent by the user for certain transactions in a particular category to an average amount spent in that category for the same income range, individuals in the same geographic region, the same profession, or other measure. The number of times per week a user dines out may also be analyzed and compared to some norm.

In addition, the users' preferences may also be received and accounted for in the analysis of the financial data in step 158. For example, a user may be given the option of selecting a category that they would like to target for reduction. This option may come before or after the advice is displayed in steps 160, below. If the advice had already been displayed, then the financial data may be analyzed again and new advice determined in step 158. In addition, the user may select how aggressive they would like the change to be. For example, the user may select from very aggressive, aggressive, average, slight/small changes. Based on the user's selection, the advice determined may differ. In particular, the size of the reduction determined in step 158 may change. Thus, the users' feedback may be used in determining the advice in step 158.

Further, step 158 may also determine the advice based on the users' previous spending habits. For example, the amount of reduction advised to the user may be based upon what the user spent in a particular category. This reduction may be a flat amount or may be a percentage of, for example, the user's expenditures in the category. As the user's spending in the category changes, the advice may be updated based on the most recent spending in the category. Thus, the amount expenditures in a category are desired to be reduced may be determined based on the user's feedback, the user's spending, the user's background financial information, the transaction information, and other financial information. Thus, the advice determined in step 158 may be better tailored to individual users. Better tailoring of the advice, particularly giving the users and opportunity to directly affect the advice given, may increase the impetus for a user to follow the advice.

Based on analysis such as the comparisons described above, expenditures in a particular category of transaction may be targeted for reduction in step 158. In one embodiment, the category is targeted for a particular amount of time. In one embodiment, the analysis determines the categories having the largest positive deviation from some amount deemed appropriate. For example, a category that shows the greatest expenditures or the greatest difference in expenditures from the norm may be identified as the first to be targeted for reduction. In one embodiment, only one category is targeted for reduction first. In such an embodiment, other categories may be targeted later, particularly if a user is successful in reducing expenditures in the targeted category. In another embodiment, multiple categories may be immediately targeted for reduction in expenses.

In addition to the factors above, the analysis may include a ranking of each category. The ranking corresponding to an indication of a necessity of the transaction(s) in the category. Stated differently, certain categories may be considered better candidates for a reduction of expenses. For example, the category medical expenses may be weighted such that an analysis would be more likely to select dining out for a reduction than the medical expenses category. Conversely, food-dining out (category 6 in the example above) is a category in which a user may have greater influence on how much is spent. In one embodiment, the expenses that may be more likely to be recommended to be reduced to help that person save more money each month include transactions in one or more of categories (6) Food-dining out, (5) Entertainment, (4) Clothing; (9) Utilities (such their cell phone bill); (11) Liquor Stores, Convenience Stores, Mini Marts, Specialty Stores; and (14) Personal Services such as massages, gym memberships and nail salons and other like services. The purchases in (11) Liquor Stores, Convenience Stores, Mini Marts and Specialty Stores are typically higher priced than the same products sold in large department stores and chain stores. A user may be able to save a significant amount of money just by doing their shopping at these larger stores. Thus, such areas in which that people do not realize how much they spend may also be included in categories likely to be suggested for reduced spending.

Based on the analysis and the category/categories (if any), financial advice is determined in step 158. The financial advice may indicate a change corresponding to the financial transactions. More specifically, the financial advice indicates a reduction in expenditures in the targeted categories. The financial advice may also allow users to select particular category/categories to be targeted for reduction. Thus, the user may be allowed to modify the financial advice. In one embodiment, the advice may indicate a reduction in expenditures for a particular duration, such as a week, a month, or a year. Although other periods of time may be used, a week may be more often selected because a week is believed to be a sufficient to assist in changing a user's spending habits. In other words, a weekly update to the advice and tracking is believed to be desirable. However, a period of five weeks or more in total is believed to be preferred for changing ingrained habits. Consequently, in one embodiment, the user's progress is updated weekly, financial advice may also be updated weekly, and the user congratulated and provided with rewards after successful completion of five weeks of following the advice. In addition to recommending a reduction, the financial advice might include a mechanism for reducing expenditures in the targeted category. For example, the analysis may determine that the user is spending too much on dining out and/or is dining out too many times per week. The financial advice might include reducing the amount spent in the dining out category for a month. The amount desired to be reduced may be expressed as a percentage, for example a percentage of the total, a percentage of the norm, or a percentage of the differences.

The financial advice may also provide a method for achieving the targeted reduction. In one embodiment, a substitute behavior may be ascertained and offered. For example, it may be determined based on the financial information (e.g. the category and time or purchase) that a user eats out for lunch five days per week. This category may also be targeted for a reduction in expenditures. Eating lunch out every day at work may translate to eating out twenty days per month just for lunch. The user may be offered the substitute behavior of bringing in their lunch from home at least on occasion. For example if the person brings lunch from home half the time, this may reduce the number of times this person eats out for lunch to only ten times a month. As a result, the persons' expenses may be reduced significantly without a significant adverse impact to their perceived quality of life. The financial advice might also compare the cost of the suggested behavior to the transaction costs to indicate to the user how much would be saved. Further, as time progresses, the financial advice offered in step 158 may be updated. In the example above, it may first be suggested to the user to bring lunch 2-3 times per week (ten times per month). The user may later be suggested to bring lunch four times per week. Thus, the financial advice may be updated to adapt to changes in the users' behavior and to facilitate changes in the users' behavior.

In another example, suppose a person buys their coffee every day from a coffee shop. The method 150 herein would track the data, determining that for thirty times in the month that person has spent over four dollars for a cup of coffee. This amounts to a significant expense which may dramatically increase the total expenditures in the food-dining out category (6). In step 158, the advice may include a recommendation that the user purchase an inexpensive coffee maker and make their own coffee every other morning. Although this involves an initial additional expense, the user need not give up ready-made coffee entirely. Instead, the coffee shop purchases could be reduced by 50 percent. In following months, the person may be directed to further reduce their coffee shop purchase. Thus, the person's financial situation may continue to be improved based on the recommendations provided.

Similarly, in another example, tracking and analysis may determine that a person spends significantly more than a norm in category (4) Entertainment. For example, assume that this person watches movies at theaters three times per week. The analysis may recommend the substitute behavior of renting movies and watching at home. The user could spend less money while still enjoying movies. Another user might be spending significantly more than a particular measure on shopping for category (5) Clothing. The tracking and analysis may determine that the spending in this category is larger than some measure, as well as provide a recommendation on how to reduce the spending in this category.

Figure 5:
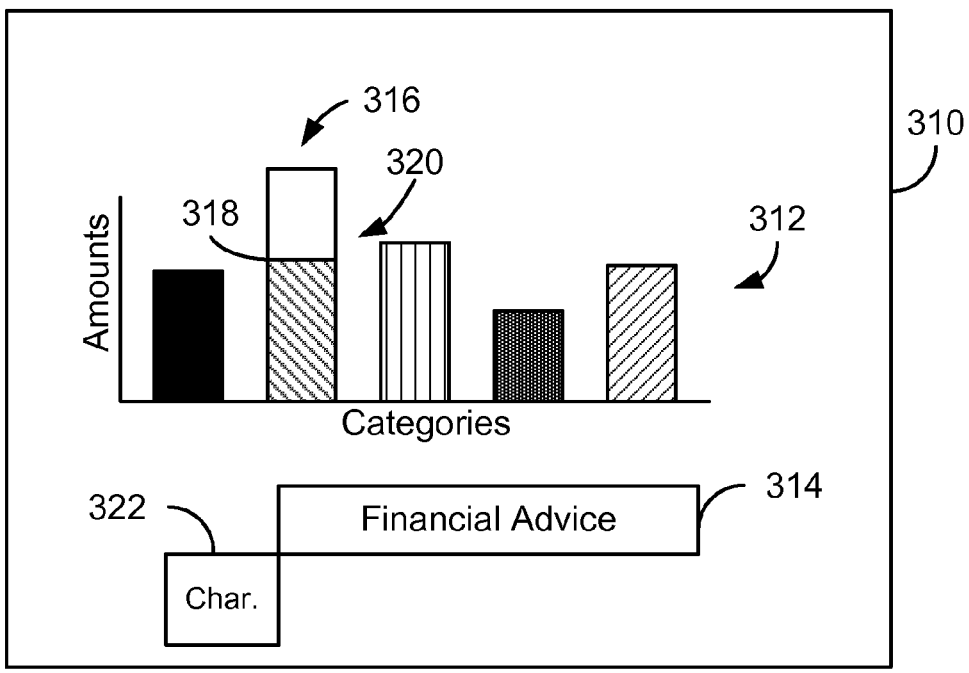
FIG. 5 depicts another exemplary embodiment of a display providing financial services.
Figure 6:
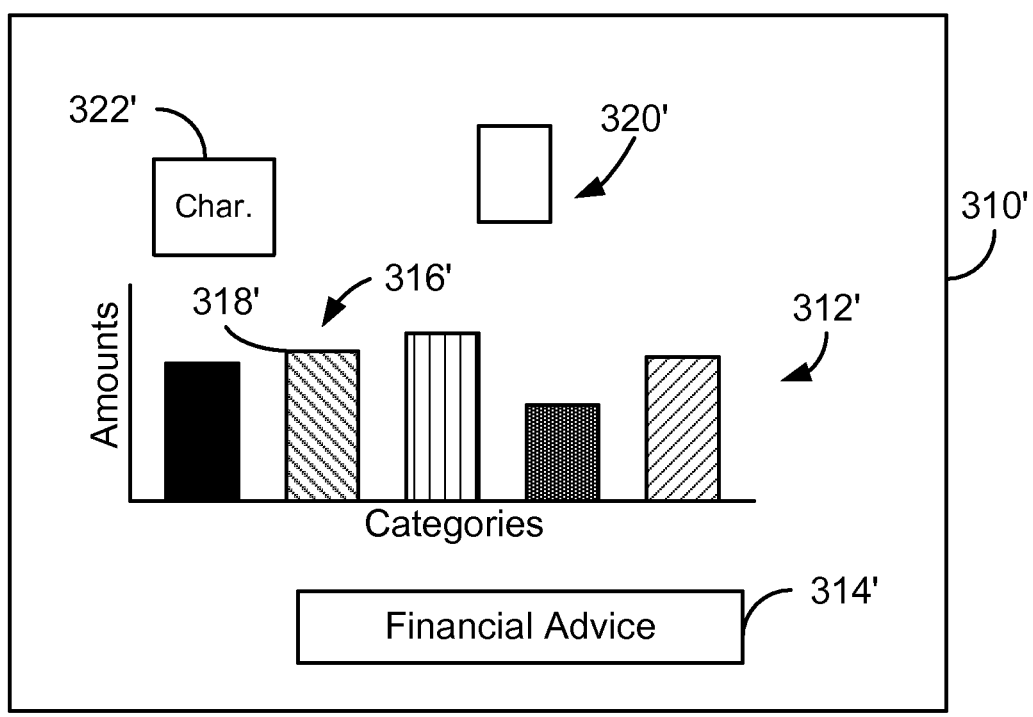
FIG. 6 depicts another exemplary embodiment of a display providing financial services.

Once the analysis determines the financial advice, the financial advice is displayed to users, via step 160. Step 160 may include displaying the financial advice on the display 264/264'/274 for the kiosk 260/260' or personal computer 270. Thus, the advice may be displayed remotely and accessible at any time. In one embodiment, the financial advice is graphically displayed. Consequently, in such an embodiment, the financial advice is not merely printed as text or played as sound. Instead, other graphics accompanies the advice. The graphics may be color and may include graph(s) indicating amounts spent in different categories and/or savings if the advice is followed and/or a character providing the advice. The "appropriate" amounts to be spent in each category as well as the amounts actually spent may thus be determined, categorized, and provided to the customer via color graphs. Different portions of the graphs may be highlighted with color(s) so that a user may more readily see where they could cut down on expenses. For example, FIG. 5 depicts a display 310 including a graph 312 and financial advice 314. The appropriate amount for one bar 316 is marked at level 318. The savings if the user follows the advice 314 is indicated by region 320. In the embodiment shown, a character 322 is shown. The graphics may be animated. For example, the graphs may change in order to reflect the changes to the user's financial status if the advice is followed. FIG. 6 depicts the display 310' after the graph 312' has been updated, for example through animation. In the embodiment shown, the character 322 has moved and the graph 312' updated. Referring back to FIGS. 2 and 3, in the lunch, coffee, and movie examples above, the amount saved for each week, as well as the total that would be saved over a month may be displayed. Viewing the larger amount saved over the month, as opposed to the small amounts spent daily, may provide sufficient impetus to aid the user in following the advice.

In addition, other charts may display other aspects of the advice. For example, it may be determined in step 158 that a user spends more than desired in category (11), Liquor Stores, Convenience Stores, Mini Marts and Specialty Stores. The advice provided may be to purchase the same products in a large department or chain store. The quantity purchased may be larger, but the purchases may be made less frequently. In step 160 charts may be provided that compare the purchases for a particular shopping day as well as over time. For a single trip, the purchases at a large department store may be a greater expenditure than purchases at a mini mart. However, over the course of a week or more, the transactions at the large department store for the same quantity of items may cost less than for the same quantity at the mini mart. This difference may be displayed to the user in charts in order to prepare the user for the larger initial costs of avoiding the mini mart and give the user confidence that over time, the planning and additional time taken to purchase a higher quantity less frequently of the same goods may result in a savings. Similarly, suppose purchases at a grocery store are in one category while dining out is a separate category and that the financial advice is to replace at least some of the eating out with dining in. In such a case, the expenditures in the grocery store category should increase. In addition, the expenditures in the dining out category should decrease. The decrease in the dining out category may be significantly higher the increase in the grocery store category. These differences as well as the total savings may be shown to the user in order to prepare the user for the changes in the categories and to provide an incentive for the user to follow the advice.

Further, as part of displaying the advice in step 160, rewards for following the advice may be displayed. At minimum, the reward provided in step 160 may include positive feedback to the user. Such rewards may be in addition to simply a reduction in costs. For example, it may be a goal to have a customer's expenses lower than their income to produce a monthly savings. If the amounts saved are to be diverted to a DRIP savings plan in which a given amount is deposited automatically each month, the increase in the savings may be displayed in step 106. The DRIP savings plan may be for a variety of purposes. For example, the plan may be for investment for retirement or for a particular desired vacation. The reward may also include lower prices for the vacation or for the services offered for the retirement plan. Other rewards offered and displayed may include a service discount, a free service in one or more of the services and/or products offered. Further, as discussed above, rewards may be offered for a behavior pattern that is related to but distinct form following the offered advice. For example, upgrades to a user's' account may be provided based upon a pattern of responsible use of the card. As discussed above, such a behavior pattern may result in the user's card being upgraded from a PIN-based card to a signature-based card and, optionally, to a credit card. Further, the user may be offered the opportunity for their pay to be direct deposited to the user's account. Further, if the kiosk 260/260' is provided at the user's employer as part of this program, the user's ability to access funds and the tracking methods 100 and 160 may be improved. In addition, use of the direct deposit may obviate a user's need to access check cashing services may be reduced. Thus, the user may enjoy a resulting savings. The user may also perform bill payment and other activities through this account. In addition, as part of the rewards for following the advice or other desired behavior, the user may be given a computer system at a discounted rate. Thus the user may be able to better access the system 200 and methods 100 and 150.

Additional financial information may be received, via step 162. In one embodiment, step 162 may be considered analogous to steps 152 and 154. The financial information may be updated and, in one embodiment, displayed, via step 164. In one embodiment, the updates are displayed only in response to users' requests. In another embodiment, the financial information may be periodically updated if, for example, the user remains connected to the system 200. Alternatively, updates might be pushed to the users' computer systems 270. Some other notification process, for example an email, might also be used. Such notifications may be in response to a new transaction occurring or may be provided periodically to prompt the user to check on their financial status.

The user's progress is thus displayed in step 164. The current financial information, as organized into categories and otherwise tracked and processed, may thus be displayed to the user in a similar manner to step 156. However, an indication of the extent to which the user has followed the advice or otherwise reduced or increased expenditures may also be provided.

Using the method 150, a user's expenditures may be tracked and analyzed. It may be determined whether there are expenditures which the user can or should reduce. The user's own preferences may be taken into account in determining the expenditures to the be reduced. Research and statistics may be used to determine the appropriate amounts to spend in each category. In addition to identifying areas ripe for reduction, the method 100 provides suggestions for modifying the user's behavior to achieve the reductions. The advice and expenditures may also be displayed to the user in a manner that highlights. To further improve the possibility that a user will heed the advice, rewards may be offered, the user's progress tracked and displayed, and the comparisons made to the user's prior expenditures. This information may be readily accessible, for example from the users' computer systems, via the Internet, and from the kiosks.

A person's spending habits may be improved in other ways using the method 150. For example, a person may simply by use the single card linked to the method 150 to purchase items that can be controlled by that person. In addition to the lunch example above, there may be many small expenses that are encountered daily. These small, often discretionary expenses may add up to large expenses when viewed as a total expense for a week, a month, and/or a year. If a user purchases these with the card, using the method 150 and system 200, the purchases can be tracked and categorized based on the business(es) at which the purchases are made. The user can then view the total amount spent on such "small" expenses and/or can receive recommendations on cutting down (or out) on some of the purchases. Thus, the user's financial situation may again be improved. Furthermore, the method may be applied to younger users so that they may learn about financial health early in life. Young people may utilize the method 150, for example with a PIN-based or signature-based card. The tracking, budgeting through the use of the financial advice and continued tracking may teach younger users how to achieve financial well being earlier in life. Further, a user may continue to track expenditures. Thus, in addition to learning improved finance-related habits, the users are provided with an impetus to maintain their improved habits. Thus, the users may be better educated and better maintain their improved financial health.

Thus, using the methods 100 and 150 and system 200, it may be possible to track the expenses that user(s) have control over, analyze these expenses, suggest changes to improve the user's spending for these expenses, and allow the user (s) to modify their spending in the way that may improve their financial situation. This may be accomplished while mitigating the effect the reduced spending has on the person.

A method and system for providing financial services has been disclosed. The method and system have been described in accordance with the embodiments shown, and one of ordinary skill in the art will readily recognize that there could be variations to the embodiments, and any variations would be within the spirit and scope of the present application. For example, the method and system can be implemented using hardware, software, a computer readable medium containing program instructions, or a combination thereof. Software written according to the present invention may be stored in some form of computer-readable medium, such as memory or CD-ROM, and executed by a processor. Accordingly, many modifications may be made by one of ordinary skill in the art without departing from the spirit and scope of the appended claims.

We claim:

1. A computer-implemented method to perform financial services comprising:
   receiving and storing background financial information in a database coupled with a computer, including a plurality of parameters that include
   an income of a user,
   a household income associated with said user,
   a geographic region where said user lives,
   a profession of said user;
   receiving financial information pertaining to at least one financial transaction comprising a purchase made by said user and a value of said at least one financial transaction, wherein the at least one financial transaction corresponds to a debit, credit, PIN-based card, signature-based card or stored value card;
   determining at least one category for the at least one financial transaction based on the financial information using a standard industrial classification code or SIC code associated with a business associated with said at least one transaction;
   calculating an average of a plurality of other financial transactions with said computer for a plurality of other users indexed by said at least one category and said plurality of parameters of said background financial information
   ranking the at least one category, the ranking corresponding to a necessity of each of the at least one transaction;
   determining financial advice based on the background financial information and the at least one category and the financial information pertaining to the at least one financial transaction,
   wherein the financial advice indicates a suggested change in future spending habits corresponding to the at least one financial transaction and said average of said plurality of other financial transactions for said plurality of other users indexed by said at least one category and said plurality of parameters of said background financial information;

graphically displaying at least a portion of the financial information to the user wherein the graphically displaying further includes providing at least one graph indicating an amount spent in each of the at least one category for a particular time;

displaying the financial advice to the user based on said background financial information, said at least one category and said financial information wherein the financial advice includes a suggestion to change an said amount spent in said at least one category by a particular amount in response to a user query and wherein said user query relates to said user's preferences of aggressiveness, such that said user selects an aggressiveness level of very aggressive, aggressive, average or slight changes, a suggestion to change spending for a particular one of the at least one financial transaction and a cost of said substitute behavior, and an indication to the user of how much would be saved as a cost comparison of said suggestion to change spending for said particular one of the at least one financial transaction to said value of said at least one financial transaction;

receiving additional financial information associated with another financial transaction made by the user after the financial advice has been displayed to the user;

analyzing the additional financial information to determine whether the user has followed the financial advice;

providing at least one reward to the user if the user has followed the financial advice.

2. The method of claim 1 wherein the at least one card corresponds to a corresponds to the PIN-based card for a portion of the at least one financial transaction and to a and to the signature-based card for a remaining portion of the at least one transaction.

3. The method of claim 1 wherein the displaying further includes:
displaying a character associated with the financial advice.

4. The method of claim 1 wherein the displaying further includes:
displaying the financial advice through a kiosk.

5. The method of claim 1 wherein the displaying further includes:
displaying the financial advice through a personal computing device associated with said user.

6. A computer-implemented method to perform financial services comprising:
receiving and storing background financial information in a database coupled with a computer, including a plurality of parameters that include
an income of a user,
a household income associated with said user,
a geographic region where said user lives,
a profession of said user;
receiving financial information pertaining to at least one financial transaction comprising a purchase made by said user and a value of said at least one financial transaction, wherein the at least one financial transaction corresponds to a debit, credit, PIN-based card, signature-based card or stored value card;

determining at least one category for the at least one financial transaction based on the financial information using a standard industrial classification code or SIC code associated with a business associated with said at least one transaction;

calculating an average of a plurality of other financial transactions with said computer for a plurality of other users indexed by said at least one category and said plurality of parameters of said background financial information;

ranking the at least one category, the ranking corresponding to a necessity of each of the at least one transaction;

determining financial advice based on the background financial information and the at least one category and the financial information pertaining to the at least one financial transaction, wherein the financial advice indicates a suggested change in future spending habits corresponding to the at least one financial transaction and said average of said plurality of other financial transactions for said plurality of other users indexed by said at least one category and said plurality of parameters of said background financial information;

graphically displaying at least a portion of the financial information to the user wherein the graphically displaying further includes providing at least one graph indicating an amount spent in each of the at least one category for a particular time;

displaying the financial advice to the user based on said background financial information, said at least one category and said financial information wherein the financial advice is displayed on a kiosk or on a personal computer and wherein the financial advice includes a suggestion to change an said amount spent in said at least one category by a particular amount in response to a user query and wherein said user query relates to said user's preferences of aggressiveness, such that said user selects an aggressiveness level of very aggressive, aggressive, average or slight changes, a suggestion to change spending for a particular one of the at least one financial transaction and a cost of said substitute behavior, and an indication to the user of how much would be saved as a cost comparison of said suggestion to change spending for said particular one of the at least one financial transaction to said value of said at least one financial transaction;

receiving additional financial information associated with another financial transaction made by the user after the financial advice has been displayed to the user;

analyzing the additional financial information to determine whether the user has followed the financial advice;

providing at least one reward to the user if the user has followed the financial advice.

7. The method of claim 6 wherein the at least one card corresponds to the PIN-based card for a portion of the at least one financial transaction and to the signature-based card for a remaining portion of the at least one transaction.

* * * * *